Oct. 6, 1964 H. P. CULP 3,151,812
PESTICIDE DISTRIBUTING APPARATUS WITH
AUGMENTED AIR BLAST PATTERN
Filed May 16, 1962 2 Sheets-Sheet 2
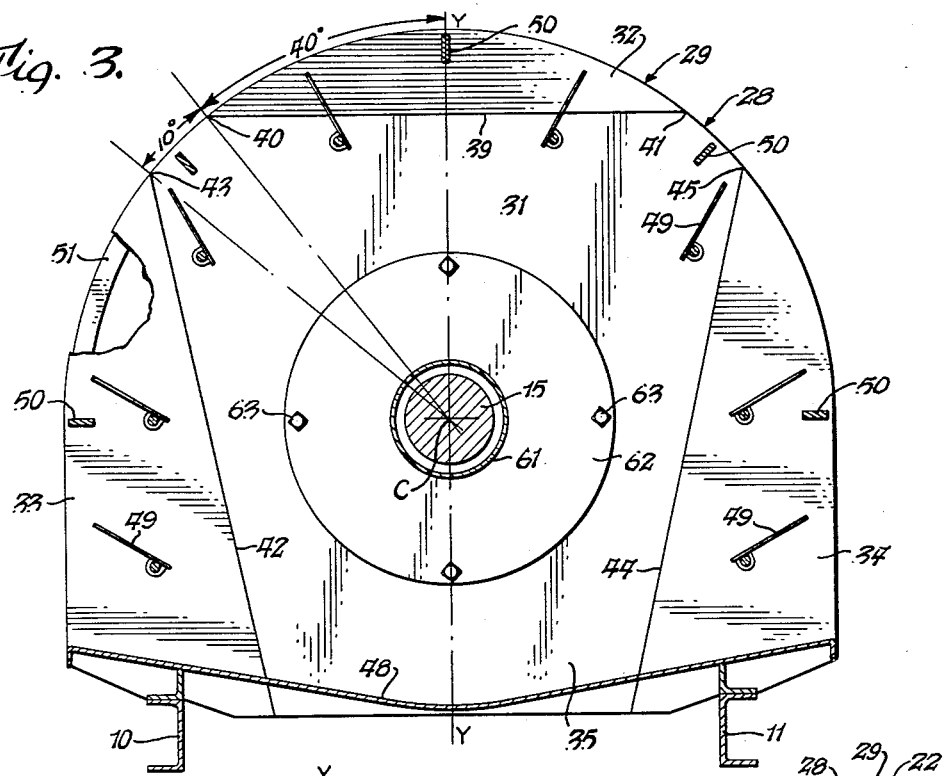
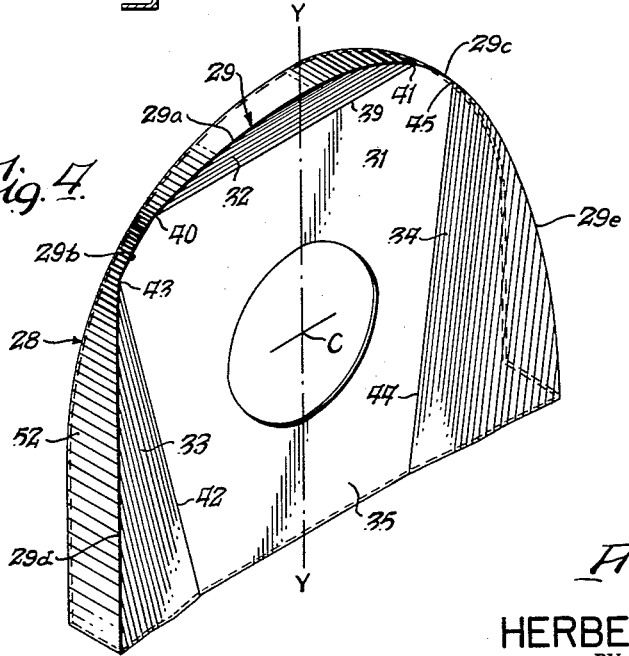
INVENTOR.
HERBERT P. CULP
BY
Popp and Sommer
ATTORNEYS.

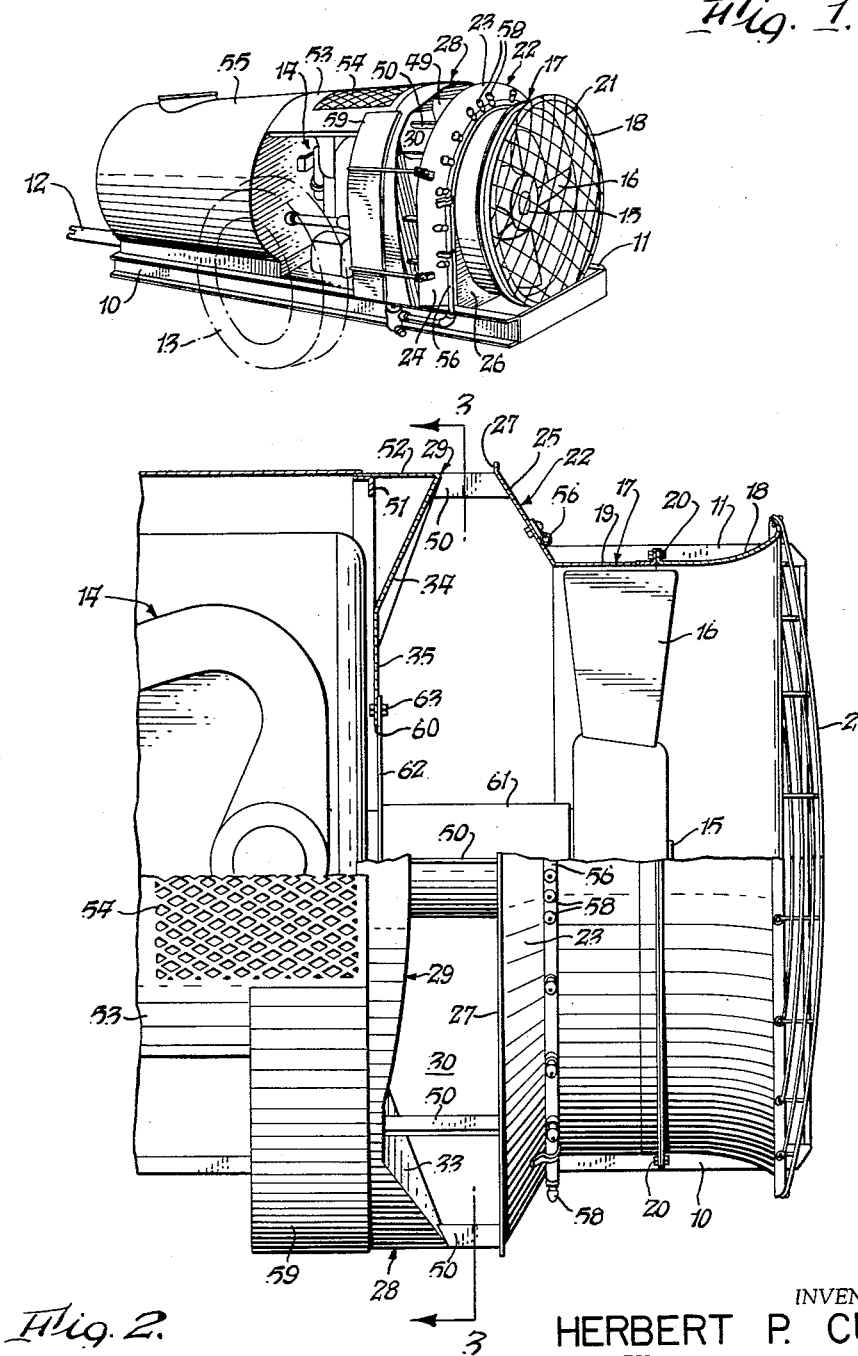

United States Patent Office 3,151,812
Patented Oct. 6, 1964

3,151,812
PESTICIDE DISTRIBUTING APPARATUS WITH AUGMENTED AIR BLAST PATTERN
Herbert P. Culp, Lockport, N.Y., assignor to Friend Manufacturing Corporation, Gasport, N.Y., a corporation of New York
Filed May 16, 1962, Ser. No. 195,087
6 Claims. (Cl. 239—78)

This invention relates to improvements in pesticide distributing apparatus of the orchard sprayer type, and more particularly to providing such apparatus with an augmented air blast pattern.

Heretofore most orchard sprayers have had an inverted generally U-shaped air discharge aperture of substantially uniform width throughout its length from end to end so that a fan-shaped air blast of substantially uniform cross-section was created to which pesticide, whether liquid or powdered or both, was suitably added. In many uses, it was found that with a sprayer of a given size penetration of tree foliage by the air blast was unsatisfactory. To overcome this, a sprayer of greater capacity was sometimes used. While this may have produced the penetration desired in some cases, it was achieved at a sacrifice of efficiency since not only was a larger sprayer required but an excessive amount of spray was lost in being discharged in undesired directions such as below the tree foliage or vertically upwardly when the sprayer was moved along the aisle-like clearing between two rows of trees.

Accordingly, the primary object of the present invention is to overcome the deficiencies of the prior art sprayers by controlling the pattern of the pesticide bearing air blast discharged by the sprayer so that the volume of air is increased in a portion of the pattern where desired and decreased elsewhere in the pattern where a smaller volume of air is acceptable.

Another object is to increase or augment the air blast discharged by the sprayer in the zone of from about 40° to about 50° on each side of a central vertical centerline of the air discharge aperture. This permits the desired amount of pesticide to penetrate through the outer foliage of trees on opposite sides of the sprayer and to reach the foliage at the tops of these trees.

Another object is to achieve the controlled air blast pattern with volumetric augmentation in the desired portions thereof in a highly efficient manner, considering the capacity of the air blast generating means of a given sprayer.

Another object is to provide the augmented air blast pattern in a structurally simple and relatively inexpensive manner.

Other objects and advantages of the invention will be apparent from the following detailed description of a preferred embodiment thereof illustrated in the accompanying drawings in which:

FIG. 1 is a perspective view of pesticide distributing apparatus of the mobile orchard sprayer type constructed in accordance with the principles of the present invention.

FIG. 2 is an enlarged fragmentary top plan view of the rear end portion of the sprayer shown in FIG. 1, with the upper half of the view illustrating the sprayer in section.

FIG. 3 is a vertical transverse sectional view thereof taken on line 3—3 of FIG. 2.

FIG. 4 is a perspective elevational view, on a somewhat diminished scale, of the air deflector means which defines one edge of the aperture through which air is discharged.

FIG. 5 is a developed view of the two edges of structure which are spaced apart non-uniformly to provide the improved air discharge aperture of variable width.

The present invention is shown as embodied in pesticide distributing apparatus of the trailed orchard sprayer type. Such sprayer is illustrated as having a frame including a spaced pair of longitudinal channel frame members 10 and 11 suitably connected at their front ends to a drawbar 12 adapted to be connected to a towing vehicle such as a tractor (not shown). The frame is supported on wheels arranged on opposite sides, one of which wheels is phantomly indicated by broken lines at 13. Suitably supported on the sprayer frame midway of its ends is an engine 14, preferably of the internal combustion type, adapted to rotate a rearwardly extending horizontal shaft 15 to the rear end of which a bladed fan wheel 16 is suitably secured. The fan 16 may be of any suitable construction and is shown as rotatably arranged within casing means indicated generally at 17 which confines the air induced to be moved by the fan when rotated.

While the casing means 17 may be constructed in any suitable manner, the same is shown as including a gradually outwardly flared tubular rear section 18 suitably connected at its front or left end, as viewed in FIG. 2, to the rear or right end of an intermediate cylindrical tubular section 19. Such connection is shown as being by out-turned flanges attached by bolts and nuts indicated at 20. The outer or inlet end of the rear casing portion 18 is shown as covered by a wire mesh guard 21 mounted in any suitable manner. Flaring outwardly and forwardly from the front end of the intermediate casing section 19 is a front section 22 comprising an upper semi-circular flared part 23 integrally connected at opposite ends to upright lower flared parts 24 and 25. The rear edge of the semi-circular part 23 is suitably connected as by welding to the upper semi-circular half of the front edge of the intermediate casing section 19. The rear edges of the lower flared parts 24 and 25 are severally connected in any suitable manner as by welding to the outer vertical edges of vertically disposed transversely extending plate parts 26, each having a curved inner edge which is suitably connected as by welding to the corresponding curved lower quadrant portion of the front edge of the intermediate casing section 19.

The front or free edge, generically represented by the numeral 27, of the front casing section 22 has all of its portions lying substantially in a single transverse plane. As shown in the developed illustration of this edge in FIG. 5, it will be seen that the edge 27 is a straight line arranged at the front of the front casing section 22 and in spaced relation to this edge are air deflector means represented generally by the numeral 28 having a rear edge represented generally by the numeral 29 to provide therebetween an air discharge aperture 30 of variable width as more fully explained later herein.

The air deflector means 28 are shown as including a central wall portion 31 preferably flat and vertically disposed, an upper baffle portion 32 preferably flat and a pair of lateral baffle portions 33 and 34 each also preferably flat. The wall portion 31 and the baffle portions 32–34 are preferably formed from a single piece of sheet metal represented by the numeral 35, suitably formed in outline and bent into the desired configuration. Viewing the rear face of the transversely extending sheet metal wall 35 as illustrated in FIG. 3, it will be seen that the edge 29 thereof has an inverted generally U-shaped outline including a top semi-circular section connected at opposite ends to lower vertical edge sections. The air deflector edge 29 is substantially coterminous with the casing edge 27.

To provide the upper baffle 32, the upper central segment of the sheet metal wall 35 is shown as being bent along a horizontal chordal line 39 which at opposite ends intersects with the edge 29 at points indicated at 40 and 41. These points 40 and 41 are located about 40° from and on opposite sides of a vertical centerline Y—Y passing through the center C of the aforementioned semicircular section of the sheet metal wall 35. The flat baffle 32 so provided tilts or inclines upwardly and rearwardly toward the front edge 27 of the casing means 17. The lateral marginal portion of the sheet metal wall 35 forming the lateral baffle 33 is shown as being bent along an upwardly and outwardly inclining rectilinear line 42 which at its upper end intersects the edge 29 at a point 43 located about 50° from the vertical centerline Y—Y and on the corresponding side thereof. Similarly, the other lateral marginal portion of the sheet metal wall 35 which provides the lateral baffle 34 is bent along an upwardly and outwardly inclining rectilinear line 44 which intersects at its upper end the edge 29 at a point designated 45 located about 50° from and on the corresponding side of the vertical centerline Y—Y. Both lateral flat baffles 33 and 34 so provided severally tilt or incline outwardly and rearwardly toward the front edge 27 of the casing means 17.

Referring to FIGS. 4 and 5, it will be seen that the edge 29 of the deflector means 28 includes a central top salient edge portion 29a which extends between points 40 and 41 to provide an upper restricted aperture portion 30a; a first adjoining intermediate flat edge portion 29b which extends between points 40 and 43 and substantially parallel to the opposing edge 27 to provide a first wider or enlarged aperture portion 30b; a similar second adjoining intermediate flat edge portion 29c at the other end of the salient edge portion 29a and which edge portion 29c extends between points 41 and 45 and substantially parallel to the opposing edge 27 to provide a second wider or enlarged aperture portion 30c; a first lower lateral edge portion 29d which adjoins the first intermediate flat edge portion 29b and which edge portion 29d is inclined convergently downwardly toward the opposing edge 27 to provide a first lower restricted aperture portion 30d; and a second lower lateral edge portion 29e which adjoins the second intermediate flat edge portion 29c and which edge portion 29e is inclined convergently downwardly toward the opposing edge 27 to provide a second lower restricted aperture portion 30e. It will thus be seen that the edge 29 has portions lying in different planes so as to be spaced non-uniformly from the single plane edge 27 to define therebetween the air discharge aperture 30 of variable width. This aperture has its greatest width in the enlarged portions 30b and 30c and gradually narrows on opposite sides of each of such portions. These enlarged aperture portions 30b and 30c are located in the 40° to 50° zone from the central vertical centerline Y—Y of the aperture and on opposite sides of such centerline where it is desired to augment the volume of air so as to have the increased range, force and coverage of the air blast for penetration of tree foliage. Between and below such zones, the volume of the air blast is decreased as is desirable.

Referring to FIG. 3, a flat V-shaped floor 48 is suitably mounted at the lower end of the transverse sheet metal wall 35 and extends between such wall and the casing means 17 below the bottom of the intermediate section 19 thereof to close off the lower portion of the space therebetween. If desired, adjustable auxiliary deflector means as typically represented at 49 may be disposed between the sheet metal wall 35 and the front section 22 of the casing means 17. Also, the spaced relationship between the air deflector means 28 and the casing means 17 is shown as being maintained by a plurality of circumferentially spaced struts or bars 50 which extend between and are suitably secured at their ends as by welding to the sheet metal wall 35 and front casing section 22.

The sheet metal wall 35 is reenforced and also maintained in the desired and described bent condition by an inverted generally U-shaped angle frame 51. Surrounding this frame 51 and suitable connected thereto as by welding and also to the edge 29 of the sheet metal wall 35, also preferably by welding, is a flange member 52. This flange 52 has a front edge extending in a single transverse plane alined with the front edge of the frame member 51, and a rear edge which is spaced non-uniformly away from its front edge so as to bridge the gap between the multi-plane edge of the bent sheet metal wall 35 and the frame member.

The air deflector assembly 28 described is suitably mounted on the main frame of the sprayer. A sheet metal curved canopy 53 having a perforated top section 54 is shown as arranged over the engine 14 and extending between the air deflector assembly 28 and the rear end of a tank 55 arranged on the sprayer frame forward of the engine 14. The tank 55 serves as a reservoir for an aqueous solution of the desired pesticide material which is adapted to be pumped by engine driven means (not shown) to a manifold spray pipe 56. The pipe 56 is shown as being arranged on the rear side of the outwardly flared front casing section 22 and is provided with a series of spaced spray nozzles 58 from which the pesticide solution can be discharged to be drawn into the air blast created upon leaving the air discharge aperture 30. If desired, the sprayer may be provided on one or both sides with a longitudinally slidable closure plate 59, shown in open position in FIGS. 1 and 2, which may be moved to cover partially the air discharge aperture 30.

The sheet metal wall 35 is shown as having a centrally located circular opening 60 through which the engine driven fan shaft 15 extends. The portion of this shaft between the wall 35 and fan 16 is preferably encased by a tubular cylindrical shell 61 having at its front end an outwardly extending annular attaching flange 62 larger in diameter than the opening 60 so as to cover this opening. Suitable fasteners such as bolts and nuts, indicated at 63, removably attach the overlapping portion of the flange 62 to the rear side of the sheet metal wall 35.

With the fan 16 rotated by the engine 14, it will be seen that air is drawn into the rear inlet end of the casing means 17 and is confined by such means while flowing forwardly therethrough. The air so moved axially by the fan impinges the wall 35 including its baffle parts 32–34 of the air deflector means 28 and is turned radially outwardly. The bottom wall 48 prevents discharge of the air downwardly toward the ground. This bottom wall jointly with the vertical wall portion 31 and the inclined baffles 32–34 direct the air for discharge through the variably wide aperture 30 which because of its restricted and enlarged portions causes a greater volume of the available air to be discharged in the 40° to 50° zones right and left of center. These are the locations where it is desired to augment the volumetric pattern of the air blast into which pesticide is drawn from the nozzles 58.

From the foregoing, it will be seen that the embodiment illustrated and described accomplishes the various objectives stated. Since modifications may occur to those skilled in the art, the embodiment shown and described is intended to be illustrative and not limitative of the invention, the scope of which is to be determined by the appended claims.

What is claimed is:

1. In pesticide distributing apparatus, the combination comprising casing means arranged to confine air while flowing therethrough and at one end having a first edge, air deflector means having a second edge substantially coterminous with said first edge and including a top semicircular section of which a central portion extends arcuately from a point located about 40° on one side of a vertical centerline passing through the center of said semicircular section to another point located about 40° on the other side of said centerline, said central portion lying in a plane different from that for other portions of said second edge and being spaced more closely to said first edge to provide therebetween an air discharge aperture having a restricted upper portion, and means for flowing air through said casing means for discharge through said aperture.

2. In pesticide distributing apparatus, the combination comprising casing means arranged to confine air while flowing therethrough and at one end having a first edge, air deflector means having a second edge substantially coterminous with said first edge and including lower sections connected by a top semi-circular section, the portion of said second edge on each side of a vertical centerline passing through the center of said semicircular section beginning at and extending below a point located about 50° from said centerline lying in a plane different from that for other portions of said second edge and being spaced more closely to said first edge to provide therebetween an air discharge aperture having a restricted lower portion, and means for flowing air through said casing means for discharge through said aperture.

3. In pesticide distributing apparatus, the combination comprising casing means arranged to confine air while flowing therethrough and at one end having a first edge, air deflector means having a second edge substantially coterminous with said first edge and including lower sections connected by a top semi-circular section, the portion of said semi-circular section on each side of a vertical centerline passing through the center thereof extending arcuately from a point located about 40° to another point located about 50° from said centerline lying in a plane different from that for other portions of said second edge and being spaced farther away from said first edge to provide therebetween an air discharge aperture having a wider portion in each quadrant of said semi-circular section, and means for flowing air through said casing means for discharge through said aperture.

4. In pesticide distributing apparatus, the combination comprising casing means arranged to confine air while flowing therethrough and at one end having a first edge all portions of which lie substantially in a single plane, air deflector means spaced from said one end of said casing means and including wall means extending transversely thereof, first baffle means arranged above said wall means and inclining upwardly and outwardly toward said first edge and second and third baffle means arranged on opposite lateral sides of said wall means and each inclining laterally outwardly toward said first edge, said wall means and first, second and third baffle means jointly providing a second edge which is substantially coterminous with said first edge but spaced nonuniformly therefrom to provide an air discharge aperture of variable width, and means for flowing air through said casing means for discharge through said aperture.

5. In pesticide distributing apparatus, the combination comprising casing means arranged to confine air while flowing therethrough and at one end having an inverted generally U-shaped first edge all portions of which lie substantially in a single plane, air deflector means spaced from said one end of said casing means and including a sheet metal wall extending transversely thereof and on its top and lateral sides having an inverted generally U-shaped outline, the upper central segment of said wall being bent along a horizontal chordal line to provide a first flat baffle tilted toward said first edge, the marginal portions of said wall on said lateral sides being bent severally along an upwardly and outwardly inclining rectilinear line to provide a pair of second flat baffles severally tilted toward said first edge, said wall having a second edge which is substantially coterminous with said first edge but spaced non-uniformly therefrom to provide an air discharge aperture of variable width, and means for flowing air through said casing means for discharge through said aperture.

6. In pesticide distributing apparatus, the combination comprising casing means arranged to confine air while flowing therethrough and at one end having an inverted generally U-shaped first edge all portions of which lie substantially in a single plane, air deflector means spaced from said one end of said casing means and including a sheet metal wall extending transversely thereof and having a second edge of inverted generally U-shaped outline including a top semi-circular section and spaced from and substantially coterminous with said first edge, the upper central segment of said wall being bent along a horizontal chordal line intersecting at opposite ends said second edge at points located about 40° from and on opposite sides of a vertical centerline passing through the center of said semi-circular section to provide a first flat baffle tilted toward said first edge, each of the lateral marginal portions of said wall on opposite sides of said centerline being bent along an upwardly and outwardly inclining rectilinear line intersecting at its upper end said second edge at a point located about 50° from and on the corresponding side of said centerline to provide a pair of second flat baffles severally tilted toward said first edge, whereby said second edge is spaced non-uniformly from said first edge to provide an air discharge aperture of variable width, and means for flowing air through said casing means for discharge through said aperture.

References Cited in the file of this patent

UNITED STATES PATENTS

| | | |
|---|---|---|
| 1,805,782 | Munz | May 19, 1931 |
| 2,295,088 | Kleucker | Sept. 8, 1942 |
| 2,338,273 | Wilkins | Jan. 4, 1944 |
| 2,470,519 | Peterson et al. | May 17, 1949 |
| 2,551,789 | Copley | May 8, 1951 |
| 2,569,274 | Andrews | Sept. 25, 1951 |
| 2,921,435 | Landgraf | Jan. 19, 1960 |
| 3,029,030 | Dey | Apr. 10, 1962 |
| 3,085,754 | Thompson | Apr. 16, 1963 |

FOREIGN PATENTS

| | | |
|---|---|---|
| 146,854 | Sweden | Sept. 7, 1954 |